United States Patent
Shetty et al.

(10) Patent No.: US 8,135,402 B1
(45) Date of Patent: Mar. 13, 2012

(54) NETWORK ACCESS BASED ON CONTROL-CHANNEL STATUS

(75) Inventors: Manoj Shetty, Overland Park, KS (US); Sachin R. Vargantwar, Overland Park, KS (US); Bhagwan Khanka, Lenexa, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 437 days.

(21) Appl. No.: 12/488,655

(22) Filed: Jun. 22, 2009

(51) Int. Cl.
*H04J 3/00* (2006.01)
(52) U.S. Cl. ...................... 455/434; 370/336; 455/432.3
(58) Field of Classification Search .... 455/422.1–435.3, 455/445–453, 509; 370/328–338
See application file for complete search history.

(56) References Cited

U.S. PATENT DOCUMENTS

| | | | |
|---|---|---|---|
| 5,537,414 A * | 7/1996 | Takiyasu et al. ............. | 370/347 |
| 6,990,353 B2 | 1/2006 | Florkey et al. | |
| 7,729,696 B2 * | 6/2010 | Harris et al. ............... | 455/432.3 |
| 2006/0084432 A1 * | 4/2006 | Balasubramanian et al. | 455/434 |
| 2006/0111135 A1 | 5/2006 | Gray et al. | |
| 2011/0044300 A1 * | 2/2011 | Joshi et al. ................. | 370/336 |

OTHER PUBLICATIONS

U.S. Appl. No. 11/060,040, filed Feb. 17, 2005 entitled "Group List Update System and Method".
"Law Enforcement Needs Document for Packet-Based Dispatch Service," Issue 2, Jul. 20, 2004.

* cited by examiner

*Primary Examiner* — Kent Chang
*Assistant Examiner* — Kashif Siddiqui

(57) ABSTRACT

Disclosed herein are methods and systems for sending and/or acknowledging an access probe in a radio access network. In one aspect, a method for transmitting an access probe to a radio access network, wherein time slots available to receive communications from the radio access network are defined in control-channel periods, wherein each control-channel period comprises one or more control-channel cycles, is disclosed. The method involves (a) determining a wait time until a control-channel cycle that is assigned to the access terminal; (b) making a determination as to whether or not the determined wait time is less than a predetermined maximum wait time; (c) if the determined wait time is less than the predetermined maximum wait time, then transmitting an access probe to the radio access network during the assigned control-channel cycle; and (d) otherwise, if the determined wait time is greater than the predetermined maximum wait time, then transmitting the access probe to the radio access network before the assigned control-channel cycle.

20 Claims, 5 Drawing Sheets

NETWORK ACCESS BASED ON CONTROL-CHANNEL STATUS

BACKGROUND

In a typical cellular radio communication system (wireless communication system), an area is divided geographically into a number of cell sites, each defined by a radio frequency (RF) radiation pattern from a respective base transceiver station (BTS) antenna. The base station antennas in the cells are in turn coupled to a base station controller (BSC), which is then coupled to a telecommunications switch or gateway, such as a mobile switching center (MSC) and/or a packet data serving node (PDSN) for instance. The switch or gateway may then be coupled with a transport network, such as the PSTN or a packet-switched network (e.g., the Internet).

When an access terminal (such as a cellular telephone, pager, or appropriately equipped portable computer, for instance) is positioned in a cell, the access terminal communicates via an RF air interface with the BTS antenna of the cell. As the demand for wireless communications has grown, the volume of call traffic in most cell sites has correspondingly increased. To help manage the call traffic, most cells in a wireless network are usually further divided geographically into a number of sectors, each defined respectively by radiation patterns from directional antenna components of the respective BTS, or by respective BTS antennas. These sectors can be referred to as "physical sectors," since they are physical areas of a cell site. Therefore, at any given instant, an access terminal in a wireless network will typically be positioned in a given physical sector and will be able to communicate with the transport network via the BTS serving that physical sector.

Consequently, when an access terminal connects to a transport network via a BTS, a communication path is typically established between the access terminal and the transport network via the air interface, the BTS, the BSC and the switch or gateway. Functioning collectively to provide wireless (i.e., RF) access services and transport in a wireless communication system, the BTS, BSC, MSC, and PDSN, comprise (possibly with additional components) what is generally referred to as a radio access network (RAN).

In a RAN that implements a code division multiple access (CDMA) coding scheme for air-interface communications, one or more "traffic channels" may be provided for communications between access terminals and the RAN. Further, one or more "control channels" may be provided by the RAN to send control and/or paging messages to access terminals.

Overview

In accordance with some air-interface protocols, such as under IS-856 (e.g., EV-DO), the control channels and traffic channels are time-division multiplexed together on common "forward" channels that carry communications from the RAN to access terminals operating in a coverage area serviced by the RAN. In particular, time slots bearing traffic-channel data and time slots bearing control channel-channel data may be interlaced with one another on the forward channel to achieve time-division-multiplexed transmission. As a consequence of this arrangement, increasing the resources allocated and/or used for transmission of control-channel data (e.g., control and/or paging messages), reduces the amount of resources available for traffic-channel data. Accordingly, it may be desirable to reduce the usage of control channels where possible, in order to increase the resources (e.g., bandwidth) available for user-specific traffic via traffic channels.

Under IS-856, an access terminal may send a radio access network (RAN) an access probe in various circumstances, such as when the access terminal wishes to connect to the RAN. In existing IS-856 networks, the RAN typically responds to an access probe by sending an acknowledgement (ACK) message via a control channel. The RAN typically sends the ACK in a message referred to as an asynchronous capsule, which the RAN sends on an as-needed basis in the control channel. As a result, the transmission of an ACK (or possibly a group of ACKs to multiple access terminals) typically occurs during time slots that would otherwise be allocated for the transmission of traffic-channel data. In times of high traffic, when many access probes are received and many ACKs are responsively sent, transmitting the ACKs in asynchronous capsules can significantly impact the bandwidth that is available for the traffic channels. Accordingly, exemplary methods and systems may be implemented to delay transmission of the ACK until time slots pre-allocated for control-channel data.

More specifically, in an exemplary embodiment, the ACK may be transmitted in time slots that are pre-allocated for control-channel data, in what is referred to as a "synchronous capsule." Since time slots for synchronous capsules are pre-allocated, whereas time slots for asynchronous capsules are allocated on an as-needed basis, including an ACK in an already-scheduled synchronous capsule may eliminate the need to schedule an asynchronous capsule in which to send the ACK, thereby allowing more time slots to be used for traffic-channel data. An access terminal and/or a RAN may therefore implement an exemplary method to delay transmission of the ACK until a control-channel cycle assigned to the access terminal (and in particular, until a synchronous capsule in the assigned control-channel cycle), whenever the existing wait time until the synchronous capsule is less than a predetermined threshold.

In one aspect, a method for transmitting an access probe to a radio access network, wherein time slots available to receive communications from the radio access network are defined in control-channel periods, wherein each control-channel period comprises one or more control-channel cycles, is disclosed. The method involves (a) determining a wait time until a control-channel cycle that is assigned to the access terminal; (b) making a determination as to whether or not the determined wait time is less than a predetermined maximum wait time; (c) if the determined wait time is less than the predetermined maximum wait time, then transmitting an access probe to the radio access network during the assigned control-channel cycle; and (d) otherwise, if the determined wait time is greater than the predetermined maximum wait time, then transmitting the access probe to the radio access network before the assigned control-channel cycle.

The step of determining the wait time until the assigned control-channel cycle may comprise determining a number of timeslots remaining before the assigned control-channel cycle or the number of timeslots remaining before one or more time slots assigned to the access terminal within the assigned control-channel cycle, such as the time slots allocated for a synchronous capsule in the assigned control-channel cycle. Alternatively, determining the wait time until the assigned control-channel cycle comprises determining a period of time remaining before the assigned control-channel cycle or before the one or more assigned time slots in the assigned control-channel cycle.

Further, if the determined wait time is less than the predetermined maximum wait time, then after transmitting the access probe to the radio access network, the method may involve listening for an acknowledgment message from the radio access network in a synchronous capsule during the assigned control-channel cycle, wherein the acknowledgment message is responsive to the access probe. On the other hand, if the determined wait time is greater than the predetermined maximum wait time, then the method may involve, after transmitting the access probe to the radio access network, listening for an acknowledgment message from the radio access network in an asynchronous capsule during a control-channel cycle before the assigned control-channel cycle.

In another aspect, an access terminal configured to transmit an access probe to a radio access network is disclosed. The access terminal may include (i) a communication interface configured to communicate with a radio access network, wherein time slots for receipt of communications from the radio access network are defined in control-channel periods, wherein each control-channel period comprises one or more control-channel cycles, and wherein a particular control-channel cycle is assigned to the access terminal and (ii) program logic stored in data storage and executable by at least one processor to (a) determine a wait time until the assigned control-channel cycle; (b) determine whether or not the wait time is less than a predetermined maximum wait time; (c) if the wait time is less than the predetermined maximum wait time, then transmit an access probe to the radio access network during the assigned control-channel cycle; and (d) otherwise, if the wait time is greater than the predetermined maximum wait time, then transmit the access probe to the access terminal before the assigned control-channel cycle. The access terminal may further include a user interface configured to receive input to initiate a communication from a user, as well as program logic that is executable to perform (a)-(d) in response to the input from the user.

The method may additionally involve determining the sector load in the sector in which the access terminal (from which the access probe is received) is operating. The method may therefore involve making a determination that the sector load is greater than a threshold load, and, in response to this determination, performing the method of claim 13.

In a further aspect, in a radio access network wherein time slots provided for communications with access terminals are defined in control-channel periods, wherein each control-channel period comprises one or more control-channel cycles, a system is disclosed. The system comprises (i) a communication interface configured to receive an access probe from an access terminal, wherein the access terminal is assigned a particular control-channel cycle; (ii) program logic stored in data storage and executable by at least one processor to, in response to receiving the access probe (a) determine a wait time until the assigned control-channel cycle; (b) determine whether or not the wait time is less than a predetermined maximum wait time; (c) if the wait time is less than the predetermined maximum wait time, then transmit an acknowledgment message to the access terminal during the assigned control-channel cycle, wherein the acknowledgment message is responsive to the received access probe; and (d) otherwise, if the wait time is greater than the predetermined maximum wait time, then transmit the acknowledgment message to the access terminal before the assigned control-channel cycle.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION

The present invention will be described by way of example with reference to Code Division Multiple Access ("CDMA") communications in general, and to IS-2000 and IS-856 communications in particular. As described below, IS-2000 applies to both circuit-cellular and packet-data communications, and may be referred to herein as "conventional" CDMA communication. IS-856 applies more exclusively to packet-data communications (including, e.g., real-time voice and data applications), and may be referred to herein as "high rate" packet-data communications. Under IS-2000, packet-data communications are referred to as "1X-RTT" communications, also abbreviated as just "1X." However, since IS-2000 supports both circuit voice and packet data communications, the term 1X (or 1X-RTT) is sometimes used to more generally refer the IS-2000 air interface, without regard to the particular type of communication carried. Packet-data communications under IS-856 are conventionally referred to as "EVDO" communications. It should be understood that the present invention can apply to other wireless voice and data protocols including, without limitation, IS-95, GSM, Bluetooth, WiMAX, 802.11, etc.

Figure 1:
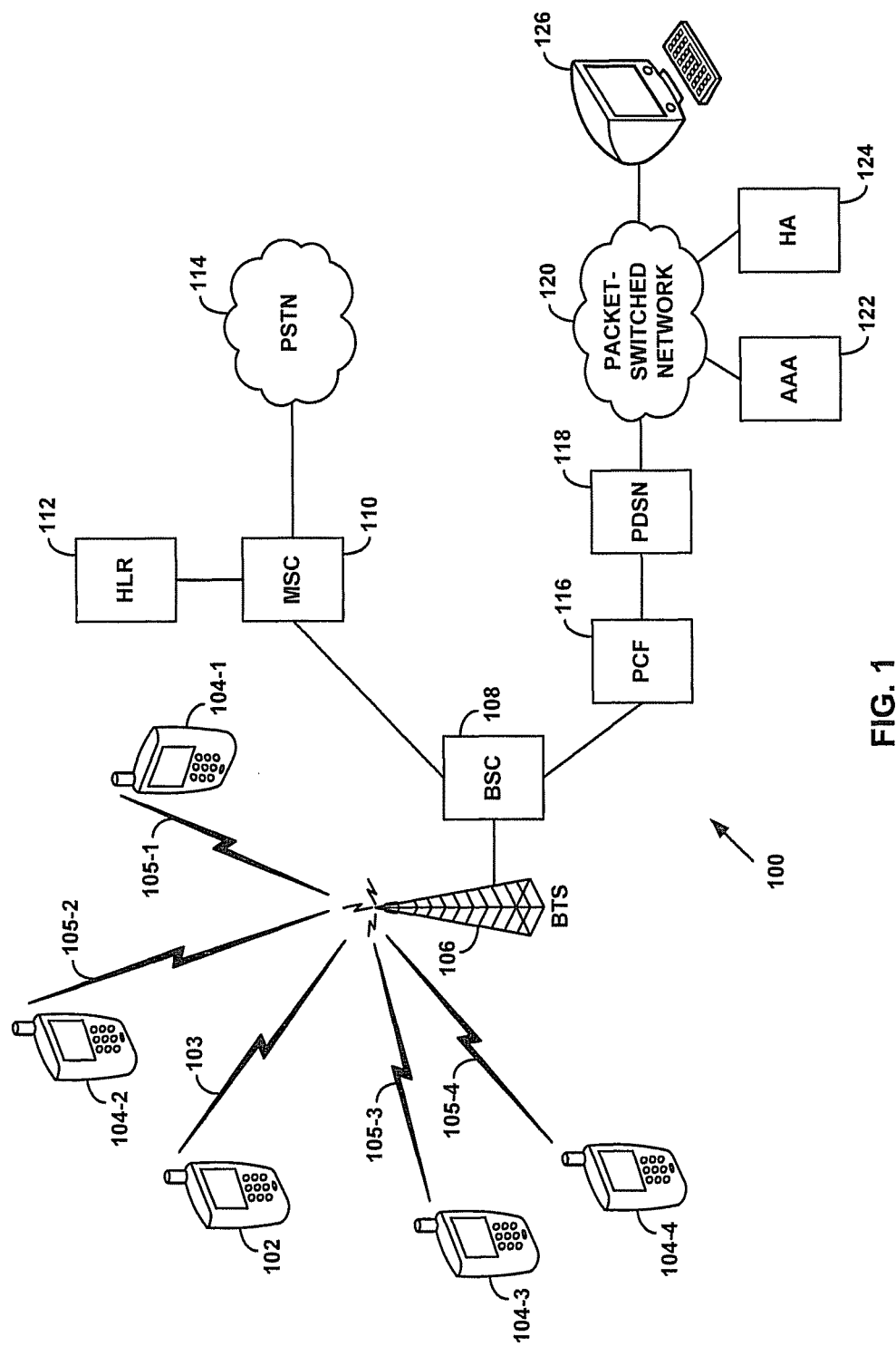
FIG. 1 shows a simplified block diagram of a wireless communication system, according to an exemplary embodiment.

FIG. 1 shows a simplified block diagram of a wireless communication system 100 in which an exemplary embodiment may be implemented. Access terminal 102 communicates over an air interface 103 with a BTS 106, which is then coupled or integrated with a BSC 108. Transmissions over air interface 103 from BTS 106 to access terminal 102 are referred to as "forward-link" communications, while transmissions over interface 103 from access terminal 102 to BTS 106 are referred to as "reverse-link" communications. Four other access terminals, access terminal 104-1, 104-2, 104-3, and 104-4, are also depicted in FIG. 1. As indicated, they communicate with BTS 106 over air interfaces 105-1, 105-2, 105-3, and 105-4, respectively. Each of these air interfaces is operationally similar to air interface 103, each representing at least a forward and reverse link. It will be appreciated that this arrangement is for purposes of illustration.

BSC 108 is connected to MSC 110, which acts to control assignment of air traffic channels (e.g., over air interfaces 103, 105-1, 105-2, 105-3, and 105-4), and provides access to wireless circuit-switched services such as circuit-voice and circuit-data (e.g., modem-based packet data) service. As represented by its connection to PSTN 114, MSC 110 is also coupled with one or more other MSCs or other telephony circuit switches in the operator's (or in a different operator's) network, thereby supporting user mobility across MSC regions, and local and long-distance landline telephone services. Also connected to MSC 110 is home location register (HLR) 112, which supports mobility-related aspects of subscriber services, including dynamic tracking of subscriber registration location and verification of service privileges.

As shown, BSC 108 is also connected with a PDSN 118 by way of packet control function (PCF) 116. PDSN 118 in turn provides connectivity with a packet-switched network 120, such as the Internet and/or a wireless carrier's private core packet-network. Sitting as nodes on network 120 are, by way of example, an authentication, authorization, and accounting (AAA) server 122, a mobile-IP home agent (HA) 124, and a remote computer 126. After acquiring an air traffic channel over its air interface, an access terminal (e.g., access terminal 102) may send a request to PDSN 118 for a connection in the packet data network. Then, following authentication of the access terminal by AAA server 120, the access terminal may be assigned an IP address by the PDSN or by HA 124, and may thereafter engage in packet-data communications with entities such as remote computer 126.

It should be understood that the depiction of just one of each network element in FIG. 1 is illustrative, and there could be more than one of any of them, as well as other types of elements not shown. The particular arrangement shown in FIG. 1 should not be viewed as limiting with respect to the present invention. Further, the network components that make up a wireless communication system such as system 100 are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network, and operable to transmit and receive the communications and messages described herein, and one or more computer software programs and related data (e.g., machine-language instructions and program and user data) stored in the one or more forms of computer-readable storage and executable by the one or more computer processors to carry out the functions, steps, and procedures of the various embodiments of the present invention described herein. Similarly, a communication device such as exemplary access terminals 102, 104-1, 104-2, 104-3, and 104-4 typically comprises a user-interface, I/O components, a communication interface, a tone detector, a processing unit, and data storage, all of which may be coupled together by a system bus or other mechanism. As such, system 100, access terminals 102, 104-1, 104-2, 104-3, and 104-4, and air interfaces 103, 105-1, 105-2, 105-3, and 105-4 are representative of exemplary means of implementing and carrying out the various functions, steps, and procedures described herein.

Throughout this description, the term "base station" will be used to refer to a Radio Access Network (RAN) element such as a BTS, a BSC, or combination BTS/BSC, for instance. The term "radio network controller" (RNC) can also be used to refer to a BSC, or more generally to a base station. In some arrangements, two or more RNCs may be grouped together, wherein one of them carries out certain control functions of the group, such as coordinating handoffs across BTSs of the respective RNCs in the group. The term controlling RNC customarily applies to the RNC that carries out these (and possibly other) control functions.

Air interface communications are divided into forward link communications, which are those passing from the base station to the access terminal, and reverse link communications, which are those passing from the access terminal to the base station. Under IS-2000, the highest rate of packet-data communications theoretically available on a fundamental traffic channel of the forward link is 9.6 kbps, dependent in part on the power allocated to the forward-link traffic channel and the resultant signal to noise characteristics. In order to provide higher rate packet-data service to support higher bandwidth applications, the industry introduced a new "high rate packet data (HRPD) system," which is defined by industry standard IS-856.

IS-856 leverages the asymmetric characteristics of most IP traffic, in which the forward link typically carries a higher load than the reverse link. Under IS-856, each access terminal maintains and manages an active set of sectors as candidates for service, but receives forward-link transmission from only one active sector at a time. In turn, each sector transmits to all its active access terminals on a common forward link using time division multiplexing (TDM), in order to transmit to only one access terminal at a time, but at the full power of the sector. As a result of the full-power allocation by the sector, an access terminal operating under IS-856 can, in theory, receive packet-data at a rate of at least 38.4 kbps and up to 2.4 Mbps. TDM access on the IS-856 forward link is achieved by dividing the forward link in the time domain into time slots of length 2048 chips each. At a chip rate of 1.228 Mega-chips per second, each slot has a duration of 1.67 milliseconds (ms). Each time slot is further divided into two 1024-chip half-slots, each half-slot arranged to carry a 96-chip pilot "burst" (pilot channel) at its center and a Medium Access Control (MAC) channel in two 64-chip segments, one on each side of the pilot burst. The remaining 1600 chips of each time slot (800 per half-slot) are allocated for a forward traffic channel or a forward control channel, so that any given time slot will carry either traffic-channel data (if any exists) or control-channel data. Traffic-channel data typically comprises user application data, while control-channel data typically comprises EVDO control messages. As in IS-2000, each sector in IS-856 is defined by a PN offset, and the pilot channel carries an indication of the sector's PN offset. Also as in IS-2000, an access terminal operating under IS-856 monitors the pilot signal emitted by various sectors in order to facilitate active set management, i.e., as a basis to facilitate handoff from one sector to another.

As noted, a given access terminal receives EVDO control messages from the RAN on a control channel that is time-division multiplexed with traffic channels to individual access terminals. EVDO control messages include system information broadcast to all access terminals having active data sessions, as well as page messages directed to specific access terminals. Page messages are typically used to send information, alerts, and requests requiring responses. For instance, an access terminal may be notified of an incoming Voice over IP (VoIP) call or push-to-talk session via a page message. For purposes of the discussion herein, an EVDO control message carrying system information shall be referred to as an "EVDO control-channel message" or simply a "control-channel message" while an EVDO control message carrying a page message shall be referred to as an "EVDO paging message" or simply a "paging message." It may be possible for a single EVDO control message to carry both an EVDO control-channel message and an EVDO paging message.

Both control messages and user-specific traffic data (e.g., email, VoIP media, push-to-talk messages, etc.) are assembled into link-layer packets, which are then subdivided into time-slot segments and scheduled for transmission in time slots on the forward link. As discussed above, "traffic packets" typically carry "traffic-channel data" and are transmitted in "traffic-channel time slots," while "control packets" typically carry "control-channel data" and are transmitted in "control-channel time slots." In EVDO communications (i.e., under IS-856), a control packet is an EVDO physical-layer control-data packet. As is known in the art, such a packet can contain a partial EVDO control message, a whole EVDO control message, or more than one EVDO control message. Again, the designations of traffic data, control data, and the like are used herein as a convenience in identifying the type of data carried in any given time slot—the formats of both designated types of time slots may otherwise be the same.

The nominal number of time slots used to transmit either a traffic packet or a control packet may depend on the forward-link data rate and the encoding method used. For instance, a data rate of 38.4 kbps using QPSK encoding nominally requires 16 time slots to transmit one packet. As another example, a data rate of 76.8 kbps using QPSK encoding nominally requires eight time slots to transmit one packet. These two data and packetization rates apply to both control packets and traffic packets. Other, higher rates that use fewer time slots may also be used, but typically apply only to traffic packets. For example, a data rate of 1,228.8 kbps using 16-QAM encoding nominally requires just two time slots to transmit one traffic packet. However, it will be appreciated the methods and principles discussed herein are not limited to a particular time slot allocation for control packets, or even control packets of other lengths.

Under IS-856, time slots are arranged with a recurring periodicity such that every 256 time slots comprise a "control-channel cycle," and every 12 control-channel cycles comprise a recurring "12-cycle control-channel period". In EVDO, each 12-cycle control-channel period comprises 12 consecutive "EVDO control-channel cycles," such that any given one of the EVDO control-channel cycles recurs once every $12^{th}$ cycle. In an exemplary embodiment, forward-link transmissions are further defined or grouped in frames, each frame being 16 time slots in length, and every 16 frames comprising one control-channel cycle. Each control-channel cycle therefore contains 256 time slots. Since each time slot is 1.67 ms in duration, each control-channel cycle spans 426.67 ms, and each 12-cycle control-channel period spans 5.12 seconds. It should be understood that EVDO control-channel cycles are but one example of the more generally-termed control-channel cycles.

While access terminals may receive certain control messages during more than one control-channel cycle of a recurrence of the 12-cycle control-channel period, page messages for any given access terminal are typically sent only during one specific control-channel cycle that recurs in each control-channel period. More particularly, a "hashing function" executed by the RAN and/or by each access terminal is used to assign each access terminal a specific control-channel cycle within the recurring 12-cycle control-channel period. In turn, the access terminal monitors each periodic recurrence of its assigned control-channel cycle for page messages. The hashing function effectively randomizes the assignments of access terminals to the control-channel cycles such that, on average, no one cycle is assigned more access terminals than any other cycle. In this sense, each access terminal is "eligible" to receive control messages at least during its assigned control-channel cycle, and possibly during other cycles as well.

In a further aspect, a RAN may schedule certain timeslots for control and/or paging messages on a periodically-recurring basis in each control-channel cycle. In particular, certain types of control messages are scheduled such that they are always allocated the same relative time-slot positions within each control-channel cycle. The paging and/or control messages sent during these pre-allocated time slots may be referred to as being sent in a "synchronous capsule" (or possibly in a "sub-synchronous capsule"). For example, each control-channel cycle may occur over a period of 5.12 seconds, so that during each control-channel cycle, the access terminal assigned that control-channel cycle listens (i.e., monitors) for control and/or paging messages from the RAN. Note that scheduling of traffic packets is not generally tied to any particular control-channel cycle, so that traffic-channel time slots for a given access terminal can occur largely anywhere during a 12-cycle control-channel period (though possibly subject to other scheduling constraints).

Other types of control and/or paging messages, referred to as asynchronous capsules or control messages, are scheduled whenever the packet scheduler can find available time slots. Such control and/or paging messages that are sent in time slots allocated on an as-needed basis, may be referred to as being sent in "asynchronous capsules." Thus, asynchronous capsules are allocated time slots from the same pool of time slots used for traffic-channel data, namely those not pre-assigned for synchronous capsules. Further, under EVDO, a RAN typically schedules the transmission of an asynchronous capsule after the transmission of any already-scheduled traffic-channel data (i.e., in the next-available time slot or time slots). It should be understood, however, that other scheduling techniques may also be employed, without departing from the scope of the invention.

The reverse link under IS-856 retains largely the traditional IS-2000 code division multiplexing (CDM) format, albeit with the addition of a "data rate control" (DRC) channel used by the access terminal to indicate the supportable data rate and best serving sector for the forward link. To facilitate connectivity, one or more access channels may be provided in the reverse link, over which access terminals may initiate communications with a RAN. In particular, to initiate or request a connection, or to register with a RAN, a mobile station may make an "access attempt" by transmitting one or more "access probes" to the RAN (for example, to a BTS) via an access channel. Each access probe may include a preamble and an access-channel data packet. According to EV-DO, the preamble duration is typically 1 frame (i.e., 16 slots). However, other access probe formats and structures are also possible.

After an access terminal transmits an access probe, it waits for a response from the RAN, which typically takes the form of an acknowledgement message referred to herein as an "ACK." If an access probe is unsuccessful and no response is received, the access terminal may transmit another access probe, at a higher power level. The access terminal continues transmitting access probes while increasing the transmit power, until an ACK is received, or a predetermined number of probes have been transmitted without response. An access attempt may therefore consist of a series of such access probes. Further, if one access attempt fails, the access terminal may wait for a period of time and then start a new access attempt. The period between successive access probes during a given access attempt, the amount by which to increase power for successive access probes, etc. are all system parameters that may be provided to access terminals by a RAN in a broadcast message over the control channel.

According to an exemplary embodiment, an access terminal is configured to transmit an access probe and/or a RAN is configured to send the responsive ACK, such that the access terminal receives the ACK during either the control-channel cycle assigned to the access terminal, or at an earlier time, depending upon the wait time until the assigned control-channel cycle. For example, if the wait time is less than predetermined threshold wait time, the ACK may be sent in a synchronous capsule during the assigned control-channel cycle, and otherwise sent in an earlier asynchronous capsule (preferably during a control-channel cycle before the assigned control-channel cycle). This may be accomplished, for example, by the access terminal determining whether or not to delay transmission of an access probe until its assigned control-channel cycle, and/or by the RAN determining whether or not to delay transmission of the responsive ACK until the assigned control-channel cycle.

Figure 2:
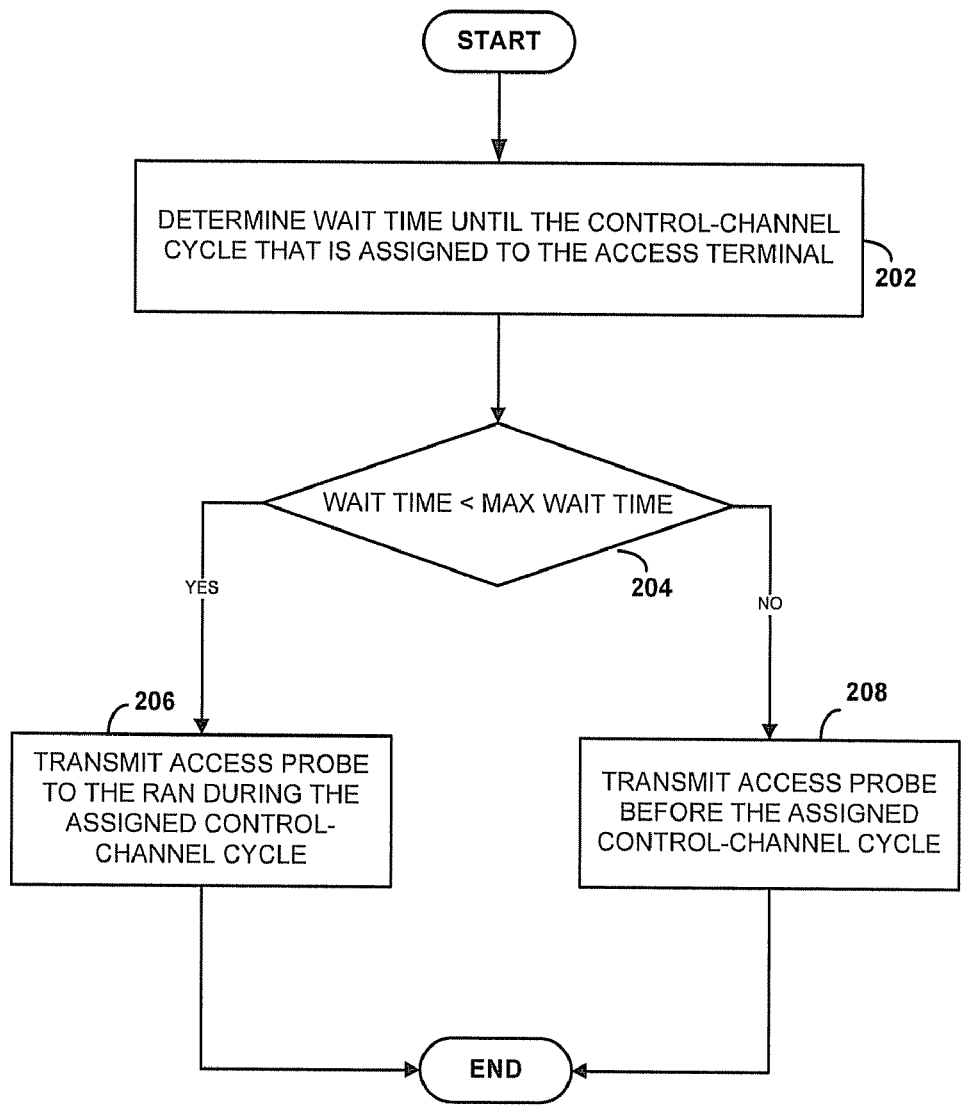
FIG. 2 is a flow chart illustrating a method for transmitting an access probe to a radio access network, according to an exemplary embodiment.

FIG. 2 is a flow chart illustrating a method for transmitting an access probe to a radio access network, according to an exemplary embodiment. The method may be carried out by an access terminal operating in a RAN in which time slots available to receive communications from the radio access network are defined in control-channel periods, and each control-channel period includes a number of recurring control-channel cycles, as is generally described above. Further, an access terminal may initiate an exemplary method whenever it is about to send an access probe, in order to more exactly determine the timing with which to send the access probe. However, it should be understood that an exemplary method may be implemented in other scenarios, without departing from the scope of the invention.

As shown, the method involves the access terminal determining a wait time until the control-channel cycle that is assigned to the access terminal, as shown by block 202. The access terminal then determines whether or not the wait time is less than a predetermined maximum wait time, as shown by block 204. If the wait time is less than the predetermined maximum wait time, then the access terminal transmits the access probe to the RAN during its assigned control-channel cycle, as shown by block 206. Otherwise, if the determined wait time is greater than (e.g., greater than, or greater than or equal to) the predetermined maximum wait time, then the access terminal transmits the access probe to the RAN before the assigned control-channel cycle.

The access terminal may determine the wait time until its assigned control-channel cycle using various techniques. For example, the access terminal may determine the number of timeslots which remain before the beginning of the assigned control-channel cycle. More specifically, the wait time may be calculated as the number of timeslots remaining in the current control-channel cycle (e.g., the number of time slots between the time of calculation and the end of the cycle) plus the number of time slots per control-channel cycle times the number of control-channel cycles between the current control-channel and the assigned control-channel cycle. The determined number of timeslots may then be compared to a predetermined maximum number of timeslots (i.e., the predetermined maximum wait time).

As a specific example, the access terminal may receive an input from its user indicating that the user wishes to engage in a communication, and responsively send an access probe. The input may be received 128 time slots into the second of twelve control-channel cycles in the control-channel period, and further, the access terminal may be assigned the fifth control-channel cycle in the control-channel period. Thus, the access terminal may determine that the wait time until its assigned control-channel cycle is 640 timeslots. If the predetermined maximum wait time is 768 time slots (i.e., the length of three control-channel cycles), for example, then the current wait time is less than the predetermined maximum wait time, so the access terminal waits until the fifth control-channel cycle (i.e., its assigned control-channel cycle), and then transmits the access probe. If, on the other hand, the predetermined maximum wait time were 512 time slots (i.e., the length of two control-channel cycles), the access terminal would determine the wait time was too long, and thus send the access probe earlier (preferably, immediately).

As another example, the wait time may be calculated up to one or more particular time slots assigned to the access terminal during its assigned control-channel cycle. For instance, since the RAN may be configured to include an ACK in a synchronous capsule, the wait time may be calculated up until the first timeslot designated for the transmission of a synchronous capsule in the assigned control-channel cycle. Thus, the access terminal may calculate the wait time in the manner described above, and then add the number of time slots between the beginning of its assigned control-channel cycle and the first time slot designated for a synchronous capsule in the assigned control-channel cycle.

Alternatively, the wait time may be calculated in terms of a period of time, rather than a number of timeslots as illustrated in the above examples. Accordingly, the step of determining the wait time until the assigned control-channel cycle may involve determining the period of time remaining before the beginning of the assigned control-channel cycle or possibly a certain time slot within the assigned control-channel cycle.

In a further aspect, after transmitting the access probe to the radio access network, the access terminal may listen for an acknowledgment message from the RAN. For example, if the determined wait time is less than the predetermined maximum wait time, and the access terminal therefore waited until its assigned control-channel cycle to transmit the access probe, the access terminal listens for an ACK from the RAN during its assigned control-channel cycle. In particular, the access terminal may look for an ACK in a synchronous capsule received from the RAN during the assigned control-channel cycle. If, on the other hand, the determined wait time is greater than or equal to the predetermined maximum wait time, the access terminal may immediately transmit an access probe, and accordingly, listen for an ACK shortly thereafter. More specifically, the access probe may listen for an asynchronous capsule from the RAN, which includes the ACK. Other timing for the transmission of the access probe and/or the reception of the ACK may be employed, without departing from the scope of the invention.

In another aspect, the access terminal may include in the access probe an indication as to how and/or when the RAN should acknowledge the access probe. For instance, the access probe may include an indication that the RAN should send an ACK in a synchronous capsule in the assigned control-channel cycle, or an earlier asynchronous capsule. In an exemplary embodiment, for example, the access terminal may indicate that the ACK should be included in the synchronous capsule when the access terminal waits until its assigned control-channel cycle, and indicate that the ACK should be included in the asynchronous capsule when the access terminal transmits the access probe before its assigned control-channel cycle.

Figure 3:
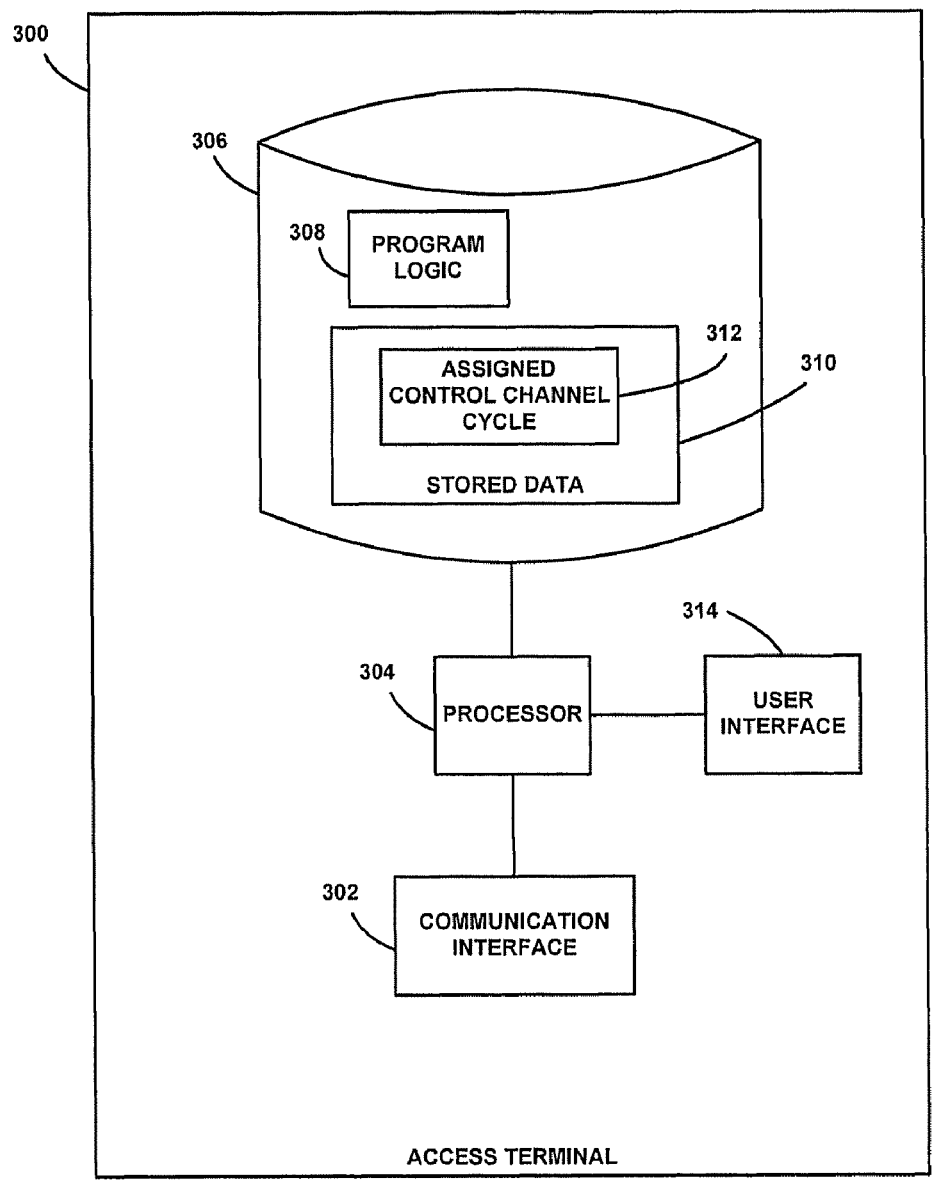
FIG. 3 is a block diagram illustrating an access terminal configured to transmit an access probe to a radio access network, according to an exemplary embodiment.

FIG. 3 is a block diagram illustrating an access terminal 300 configured to transmit an access probe to a radio access network, according to an exemplary embodiment. The access terminal may include a communication interface 302, a processor 304, and data storage 306. Data storage 306 stores program logic or instructions 308 that are executable by the processor 304 to engage in VoIP communications. Data storage 306 may further include or be used to for storage of stored data 310. Stored data 310 may include various types of data, such as an indication of the assigned control channel cycle 312 that is assigned to access terminal 300 during a given communication session. It should be understood that stored data 310 (including assigned control channel cycle 312 and/or other data) may also be stored in data storage that is separate from the data storage in which program logic 308 is stored, and further that the separate data storage may be physically included in access terminal 300, or physically separate and in communication with access terminal 300.

The program logic 308 may be carried out to (a) determine a wait time until the assigned control-channel cycle, (b) determine whether or not the wait time is less than a predetermined maximum wait time, (c) if the wait time is less than the predetermined maximum wait time, then transmit an access probe to the radio access network during the assigned control-channel cycle, and (d) otherwise, if the wait time is greater than the predetermined maximum wait time, then transmit the access probe to the access terminal before the assigned control-channel cycle. More generally, the access terminal 300 may include program logic to carry out any exemplary method, such as the method illustrated in FIG. 2. Even more generally, the program logic 308 may be executable by the processor 304 to carry out the functionality of the system described herein and otherwise.

In an exemplary embodiment, the access terminal 300 may further include a user interface (not shown), which allows the user to interact with and/or control the access terminal. The user interface may take on various forms that are well known in the art such as a keypad, a touchscreen interface, etc. Provided with the user interface, a user may provide input indicating that they would like to initiate a communication. The access terminal 300 may therefore be configured to responsively initiate the communication by transmitting an access probe to the RAN (using the functionality such as that illustrated by functions (a)-(d) above).

Figure 4:
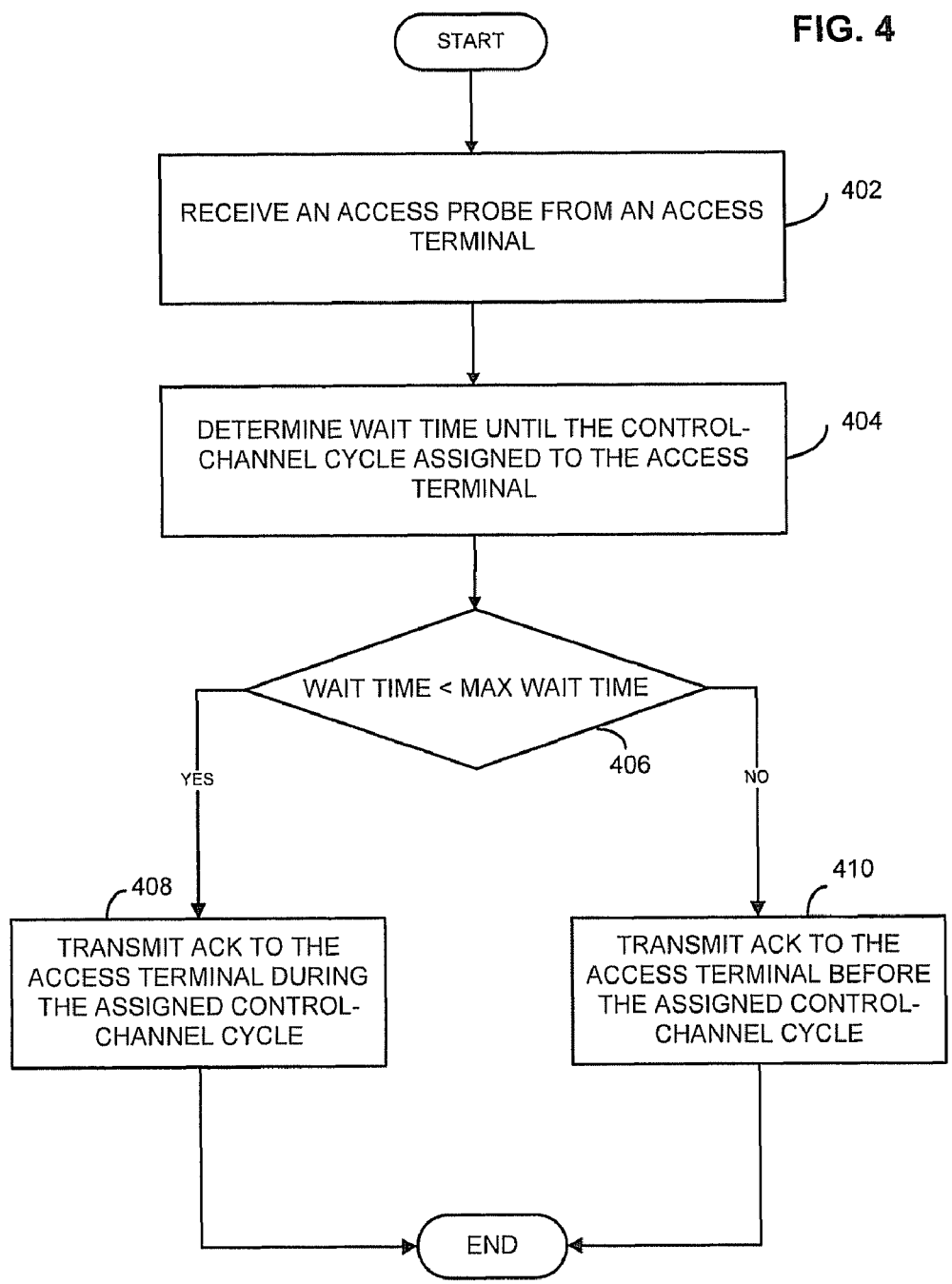
FIG. 4 is a flow chart illustrating a method for acknowledging an access probe, according to an exemplary embodiment.

FIG. 4 is a flow chart illustrating a method for acknowledging an access probe, according to an exemplary embodiment. The method illustrated in FIG. 4 may be carried out by a RAN, and preferably by a BTS and/or RNC in the RAN, in order to acknowledge an access probe from an access terminal. As shown, the method involves the RAN receiving an access probe from an access terminal, as shown by block 402. As described herein, the access terminal may be assigned a particular control-channel cycle in which it receives certain control and/or paging messages intended for it. (The assignment of the control-channel cycle may occur either upon receipt of the access probe or prior to the receipt of the access probe.) In response to receiving the access probe, the RAN may determine when and/or how to transmit an acknowledgment message to the access terminal, as shown by blocks 404-410.

More specifically, the RAN may determine the wait time remaining until the control-channel cycle assigned to the access terminal, as shown by block 404. The RAN may then determine whether or not the wait time is less than a predetermined maximum wait time, as shown by block 406. If the RAN determines that the wait time is less than the predetermined maximum wait time, then the RAN transmits an ACK to the access terminal during the assigned control-channel cycle, as shown by block 408. Otherwise, the RAN transmits the acknowledgment message to the access terminal before the assigned control-channel cycle, as shown by block 410.

It should be understood that the method illustrated in FIG. 4 is implemented in a RAN, it may be unnecessary for an access terminal to implement a method such as that illustrated in FIG. 3, and vice versa. In particular, when an access terminal waits until its assigned control-channel cycle before sending an access probe, the RAN may not need to calculate and/or consider the wait time, as this may be duplicative of the functions already performed by the access terminal. Likewise, if the RAN is going to determine the wait time and whether to delay sending a response until the assigned control-channel cycle, it may be unnecessary for the access terminal to do the same before sending the access probe. However, it should be understood that it is within the scope of the invention for the access terminal and RAN to concurrently implement exemplary methods, such as those shown in FIGS. 2 and 4.

In a further aspect, an exemplary method may be performed in response to the RAN (and preferably, the BTS) determining that the sector load in a given sector is greater than a threshold load. The threshold load may be set as a matter of engineering design choice. When the RAN determines that the sector load is greater than the threshold load, the RAN may initiate an exemplary method in order to respond to subsequent access probes. Alternatively or additionally, the RAN may send a message to access terminals it serves to indicate that the sector load is greater than the threshold load, so that the mobile station can responsively perform an exemplary method.

To determine the sector load and compare it to a threshold load, the BTS may determine that the number of access terminals operating in the sector is above a threshold number, or that the total power being used by the RAN to communicate with access terminals in the sector is greater than a threshold power level. Techniques for determining the number of access terminals in a sector, and for determining the total power consumption in a sector, are well known to those skilled in the art. Other techniques for determining sector load are also possible.

Figure 5:
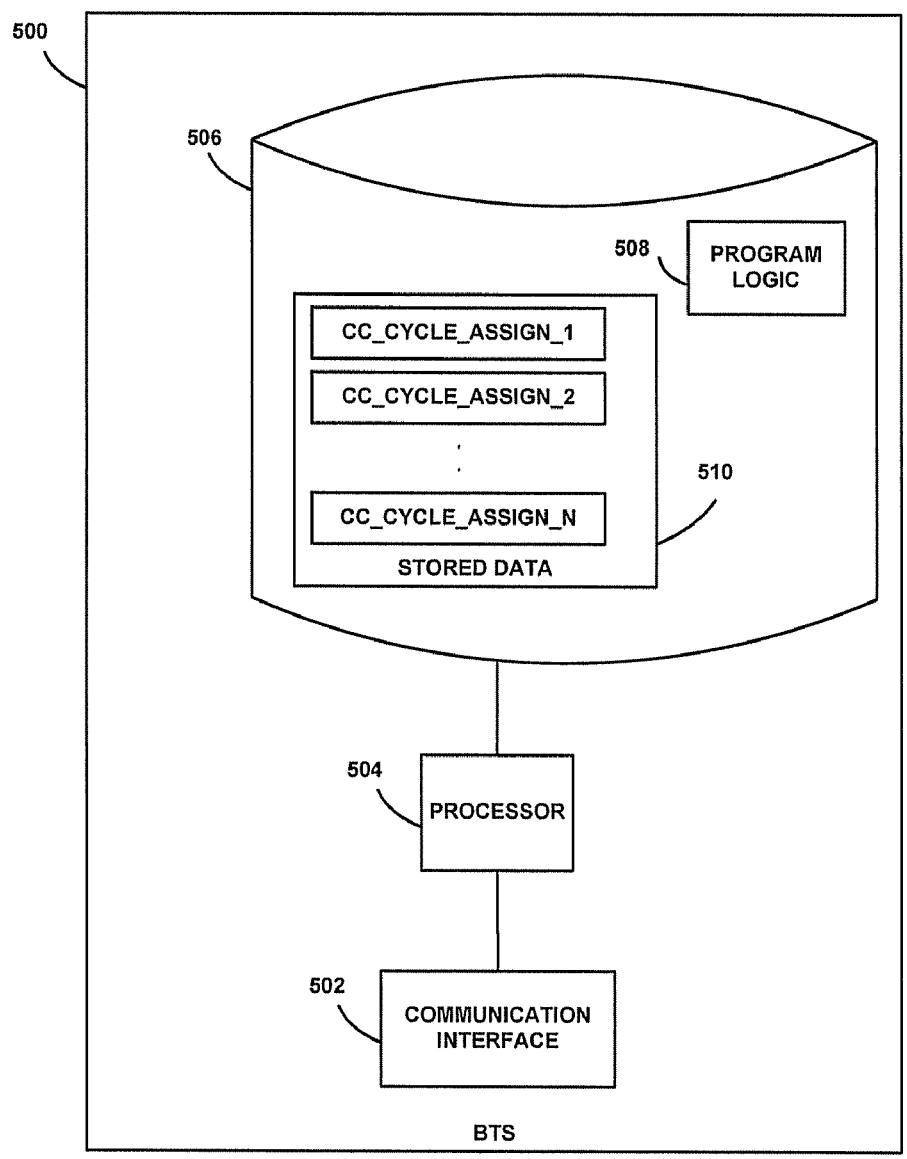
FIG. 5 is a block diagram illustrating an exemplary system configured to transmit an access probe to a radio access network, according to an exemplary embodiment.

FIG. 5 is a block diagram illustrating an exemplary system configured to transmit an access probe to a radio access network, according to an exemplary embodiment. In the illustrated embodiment, the system takes the form of a BTS 500. The BTS 500 may include a communication interface 502, a processor 504, and data storage 506. Data storage 506 stores program logic or instructions 508 that are executable by the processor 504 to provide communication services, including VoIP service, to access terminals operating in a coverage area or areas served by BTS 500. Data storage 506 may further include or be used to for storage of stored data 510. Stored data 510 may include various types of data, such as an indication the control channel cycles that are assigned to various access terminals served by BTS 500 (i.e., CC_CYCLE_ASSIGN_1, CC_CYCLE_ASSIGN_2 . . . CC_CYCLE_ASSIGN_N). It should be understood that stored data 510 may also be stored in data storage that is separate from the data storage in which program logic 508 is stored, and further that the separate data storage may be physically included in BTS 500, or physically separate (and in communication with) BTS 500.

The program logic 308 may be carried out to (a) determine a wait time until the assigned control-channel cycle, (b) determine whether or not the wait time is less than a predetermined maximum wait time, (c) if the wait time is less than the predetermined maximum wait time, then transmit an acknowledgment message to the access terminal during the assigned control-channel cycle, wherein the acknowledgment message is responsive to the received access probe, and (d) if the wait time is greater than the predetermined maximum wait time, then transmit the acknowledgment message to the access terminal before the assigned control-channel cycle.

More generally, the access terminal 500 may include program logic to carry out any exemplary method, such as the method illustrated in FIG. 4. Even more generally, the program logic 508 may be executable by the processor 504 to carry out the functionality of the system described herein and otherwise.

Exemplary embodiments of the present invention have been described above. It should be understood the word "exemplary" is used herein to mean "serving as an example, instance, or illustration." Any embodiment described herein as "exemplary" is not necessarily to be construed as preferred or advantageous over other embodiments. In addition, those skilled in the art will understand that changes and modifications may be made to these exemplary embodiments without departing from the true scope and spirit of the invention, which is defined by the claims.

We claim:

1. In an access terminal, a method for transmitting an access probe to a radio access network, wherein time slots available to receive communications from the radio access network are defined in control-channel periods and each control-channel period comprises one or more control-channel cycles, the method comprising:
    (a) determining a wait time until a control-channel cycle that is assigned to the access terminal;
    (b) making a determination as to whether or not the determined wait time is less than a predetermined maximum wait time;
    (c) if the determined wait time is less than the predetermined maximum wait time, then transmitting an access probe to the radio access network during the assigned control-channel cycle; and
    (d) if the determined wait time is greater than the predetermined maximum wait time, then transmitting the access probe to the radio access network before the assigned control-channel cycle.

2. The method of claim 1, further comprising:
    receiving an instruction to connect to the radio access network; and
    in response to receiving the instruction, performing the method of claim 1.

3. The method of claim 1, wherein the access probe is transmitted to the radio access network via an access channel.

4. The method of claim 1, wherein each control-channel cycle comprises a predetermined number of time slots, wherein determining the wait time until the assigned control-channel cycle comprises determining a number of timeslots remaining before the assigned control-channel cycle, and wherein the predetermined maximum wait time comprises a predetermined number of time slots.

5. The method of claim 1, wherein each control-channel cycle comprises a predetermined number of time slots, and wherein determining the wait time until the assigned control-channel cycle comprises determining a number of timeslots remaining before one or more time slots assigned to the access terminal within the assigned control-channel cycle, and wherein the predetermined maximum wait time comprises a predetermined number of timeslots.

6. The method of claim 1, wherein determining the wait time until the assigned control-channel cycle comprises determining a period of time remaining before the assigned control-channel cycle.

7. The method of claim 1, wherein each control-channel cycle comprises a predetermined number of time slots, wherein one or more timeslots in the assigned control-channel cycle is assigned to the access terminal, and wherein determining the wait time until the assigned control-channel cycle comprises determining a period of time remaining before the one or more assigned time slots in the assigned control-channel cycle.

8. The method of claim 1, further comprising, if the determined wait time is less than the predetermined maximum wait time, then:
    after transmitting the access probe to the radio access network, listening for an acknowledgment message from the radio access network in a synchronous capsule during the assigned control-channel cycle, wherein the acknowledgment message is responsive to the access probe.

9. The method of claim 1, further comprising, if the determined wait time is greater than the predetermined maximum wait time, then:
    after transmitting the access probe to the radio access network, listening for an acknowledgment message from the radio access network in an asynchronous capsule during a control-channel cycle before the assigned control-channel cycle, wherein the acknowledgment message is responsive to the access probe.

10. An access terminal configured to transmit an access probe to a radio access network, the access terminal comprising:
    a communication interface configured to communicate with a radio access network, wherein time slots for receipt of communications from the radio access network are defined in control-channel periods, wherein each control-channel period comprises one or more control-channel cycles, and wherein a particular control-channel cycle is assigned to the access terminal;
    program logic stored in data storage and executable by at least one processor to:
        (a) determine a wait time until the assigned control-channel cycle;
        (b) determine whether or not the wait time is less than a predetermined maximum wait time;
        (c) if the wait time is less than the predetermined maximum wait time, then transmit an access probe to the radio access network during the assigned control-channel cycle; and
        (d) if the wait time is greater than the predetermined maximum wait time, then transmit the access probe to the access terminal before the assigned control-channel cycle.

11. The access terminal of claim 10, wherein the access terminal is further comprises a user interface configured to receive input to initiate a communication from a user, the access terminal further comprising program logic stored in data storage and executable by the at least one processor to perform (a)-(d) in response to the input from the user.

12. The access terminal of claim 10, further comprising program logic stored in data storage and executable by at least one processor to:
    if the determined wait time is less than the predetermined maximum wait time, listen for an acknowledgment message from the radio access network in a synchronous capsule during the assigned control-channel cycle, wherein the acknowledgment message is responsive to the access probe; and
    if the determined wait time is greater than the predetermined maximum wait time, listen for the acknowledgment message from the radio access network in an asynchronous capsule during a control-channel cycle before the assigned control-channel cycle.

13. In a radio access network wherein time slots available for communicating with access terminals are defined in control-channel periods, wherein each control-channel period comprises one or more control-channel cycles, a method comprising:

during a particular control-channel period, receiving an access probe from an access terminal, wherein the access terminal is assigned a particular control-channel cycle;

in response to receiving the access probe:
determining a wait time until the assigned control-channel cycle;
making a determination as to whether or not the wait time is less than a predetermined maximum wait time;
if the wait time is less than the predetermined maximum wait time, then transmitting an acknowledgment message to the access terminal during the assigned control-channel cycle, wherein the acknowledgment message is responsive to the received access probe; and
if the wait time is greater than the predetermined maximum wait time, then transmitting the acknowledgment message to the access terminal before the assigned control-channel cycle.

14. The method of claim 13, wherein the access probe is received from the access terminal via an access channel in the radio access network.

15. The method of claim 13, wherein transmitting the acknowledgment message to the access terminal during the assigned control-channel cycle comprises transmitting the acknowledgment message to the access terminal in a synchronous capsule during the assigned control-channel cycle.

16. The method of claim 13, wherein transmitting the acknowledgment message to the access terminal before the assigned control-channel cycle comprises transmitting the acknowledgement message in an asynchronous capsule.

17. The method of claim of claim 13, further comprising:
determining sector load in a sector in which the access terminal is operating;
making a determination that the sector load is greater than a threshold load; and
in response to the determination that the sector load is greater than the threshold load, performing the method of claim 13.

18. In a radio access network wherein time slots provided for communications with access terminals are defined in control-channel periods, wherein each control-channel period comprises one or more control-channel cycles, a system comprising:

a communication interface configured to receive an access probe from an access terminal, wherein the access terminal is assigned a particular control-channel cycle;

program logic stored in data storage and executable by at least one processor to, in response to receiving the access probe:
(a) determine a wait time until the assigned control-channel cycle;
(b) determine whether or not the wait time is less than a predetermined maximum wait time;
(c) if the wait time is less than the predetermined maximum wait time, then transmit an acknowledgment message to the access terminal during the assigned control-channel cycle, wherein the acknowledgment message is responsive to the received access probe; and
(d) if the wait time is greater than the predetermined maximum wait time, then transmit the acknowledgment message to the access terminal before the assigned control-channel cycle.

19. The system of claim 18, further comprising program logic stored in data storage and executable by at least one processor to:
if the wait time is less than the predetermined maximum wait time, then transmit the acknowledgment message to the access terminal in a synchronous capsule during the assigned control-channel cycle; and
if the wait time is greater than the predetermined maximum wait time, then transmit the acknowledgment message to the access terminal in an asynchronous capsule during a control-channel cycle before the assigned control-channel cycle.

20. The system of claim 18, further comprising program logic stored in data storage and executable by at least one processor to:
determine sector load in a sector in which the access terminal is operating;
make a determination that the sector load is greater than a threshold load; and
in response to the determination that the sector load is greater than the threshold load, carry out the functionality of (a)-(d) when the access probe is received from the access terminal.

* * * * *